US010394512B2

(12) United States Patent
Yoon et al.

(10) Patent No.: US 10,394,512 B2
(45) Date of Patent: Aug. 27, 2019

(54) MULTI-MONITOR ALIGNMENT ON A THIN CLIENT

(71) Applicant: AMZETTA TECHNOLOGIES, LLC, Norcross, GA (US)

(72) Inventors: David Yoon, Atlanta, GA (US); Yugender P. Subramanian, Redmond, WA (US); Varadachari Sudan Ayanam, Suwanee, GA (US)

(73) Assignee: AMZETTA TECHNOLOGIES, LLC, Norcross, GA (US)

( * ) Notice: Subject to any disclaimer, the term of this patent is extended or adjusted under 35 U.S.C. 154(b) by 64 days.

(21) Appl. No.: 15/642,972

(22) Filed: Jul. 6, 2017

(65) Prior Publication Data

US 2019/0012128 A1 Jan. 10, 2019

(51) Int. Cl.
*G06F 3/14* (2006.01)
*G09G 5/12* (2006.01)

(52) U.S. Cl.
CPC ............. *G06F 3/1446* (2013.01); *G09G 5/12* (2013.01); *G09G 2370/025* (2013.01)

(58) Field of Classification Search
CPC ................................ G06F 3/1446; G09G 5/12
See application file for complete search history.

(56) References Cited

U.S. PATENT DOCUMENTS

| 2014/0184652 A1* | 7/2014 | Matel | G09G 5/08 345/681 |
| 2015/0279037 A1* | 10/2015 | Griffin | G06F 3/1446 345/1.3 |
| 2016/0224184 A1* | 8/2016 | Nordback | G06F 3/0418 |

* cited by examiner

*Primary Examiner* — Michael A Faragalla
*Assistant Examiner* — Chayce R Bibbee
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a thin client. The thin client obtains dimensions of each screen of a plurality of screens of the thin client. The thin client also determines an arrangement of the plurality of screens such that each one of the plurality of screens is in contact with at least another one of the plurality of screens and does not overlap with any other one of the plurality of screens. The thin client also determines border segments of each screen of the plurality of screens. Each of the border segments of the each screen is not in contact with any border segment of any other screens of the plurality of screens.

11 Claims, 8 Drawing Sheets

MULTI-MONITOR ALIGNMENT ON A THIN CLIENT

BACKGROUND

Field

The present disclosure relates generally to networked computer systems, and more particularly, to techniques of aligning multiple monitors and moving a pointer on a thin client.

Background

The statements in this section merely provide background information related to the present disclosure and may not constitute prior art.

Computers are becoming increasingly ubiquitous, and are becoming pervasively integrated into the environment. For many users, this introduces the issue of configuring, maintaining and managing operating systems, applications and data on a number of computers.

A thin client device or zero client device is a client computer that operates in a client-server architecture. Thin clients are arranged to perform as little processing as possible, and the majority of the processing is performed by a server to which the thin client device is connected. This is in contrast to regular desktop or laptop computers (which can be considered "thick" clients), as the majority of the processing is performed on a local processor.

As the user's data, applications and operating systems are installed centrally on the server in a thin client architecture, the issue of configuring, maintaining and managing the computers becomes more manageable for the user. A single server can be arranged to support a large number of thin client devices. Furthermore, the lower amount of processing power used by a thin client device enables it to be made smaller and more power efficient than an equivalent "thick" client.

A thin/Zero client may be connected with multiple display devices. Therefore, there is a need for a mechanism that can align screens of the multiple display devices and move a pointer within the bounds of the screens.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a thin client. The thin client obtains dimensions of each screen of a plurality of screens of the thin client. The thin client also determines an arrangement of the plurality of screens such that each one of the plurality of screens is in contact with at least another one of the plurality of screens and does not overlap with any other one of the plurality of screens. The thin client also determines border segments of each screen of the plurality of screens. Each of the border segments of the each screen is not in contact with any border segment of any other screens of the plurality of screens.

DETAILED DESCRIPTION

Figure 1:
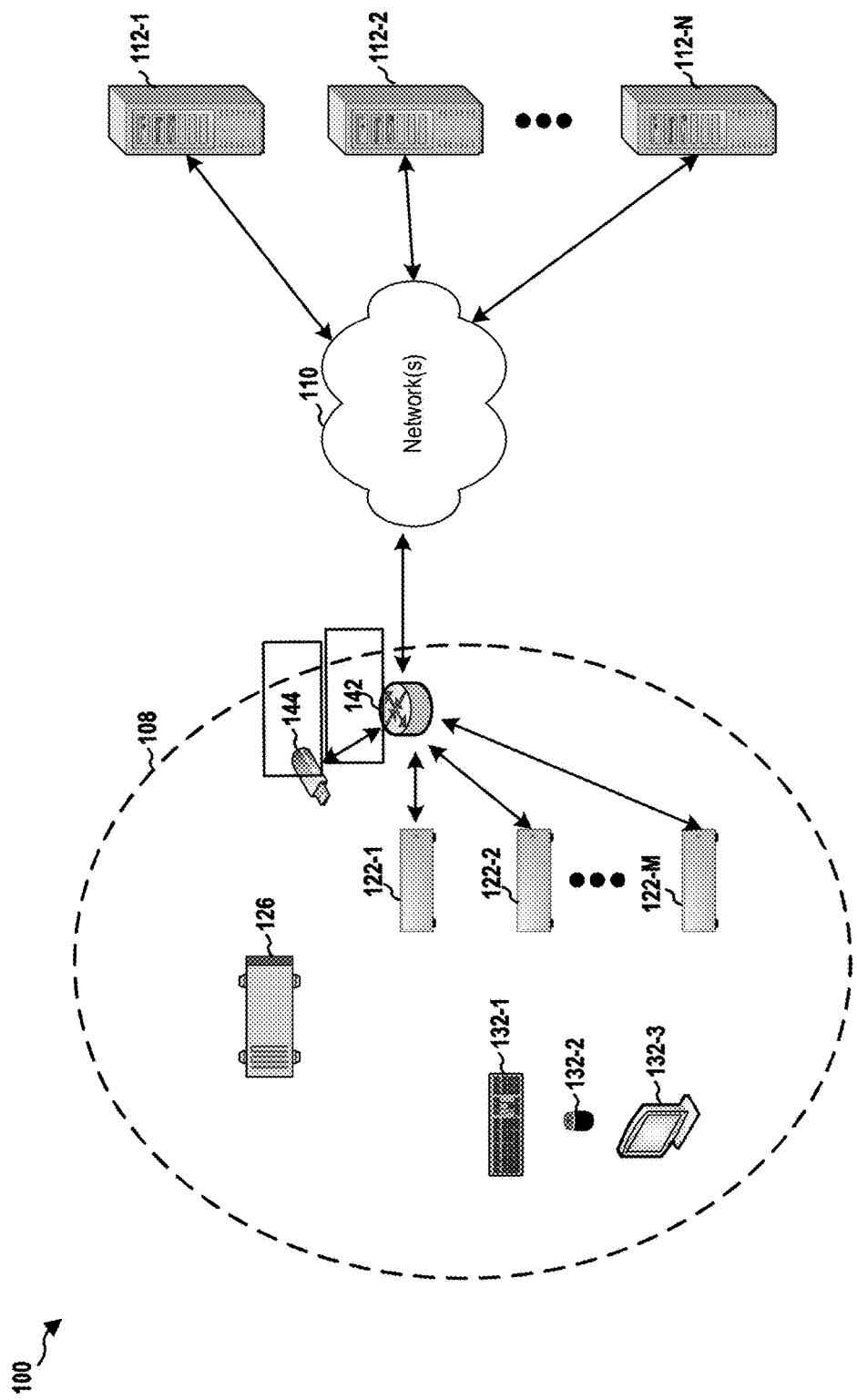
FIG. 1 is a diagram illustrating networked thin clients and remote machines.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram 100 illustrating networked thin clients and remote machines. One or more of M thin clients 122-1, 122-2, . . . , 122-M each may be utilized to establish a respective session with one or more of N remote machines 112-1, 112-2, . . . , 112-N, M and N each being a respective integer greater than 0. In certain configurations, the thin clients 122-1, 122-2, . . . , 122-M may be in communication with the remote machines 112-1, 112-2, . . . , 112-N through a network 110 (e.g., Internet). Each of the remote machines 112-1, 112-2, . . . , 112-N may be a virtual machine or a physical machine. Each of the thin clients 122-1, 122-2, . . . , 122-M may be wirelessly connected with one or more peripherals, e.g., peripherals 132-1, 132-2, 132-3.

Further, a remote machine manager 126 may be utilized to manage the thin clients 122-1, 122-2, . . . , 122-M, the remote machines 112-1, 112-2, . . . , 112-N, and/or the peripherals 132-1, 132-2, 132-3. The networked peripherals, the remote machine manager 126, and the thin clients 122-1, 122-2, . . . , 122-M may be in the same LAN 108, e.g., a wireless local area network (WLAN) or a wired LAN. In certain configurations, those devices may be in a different type of network.

Figure 2:
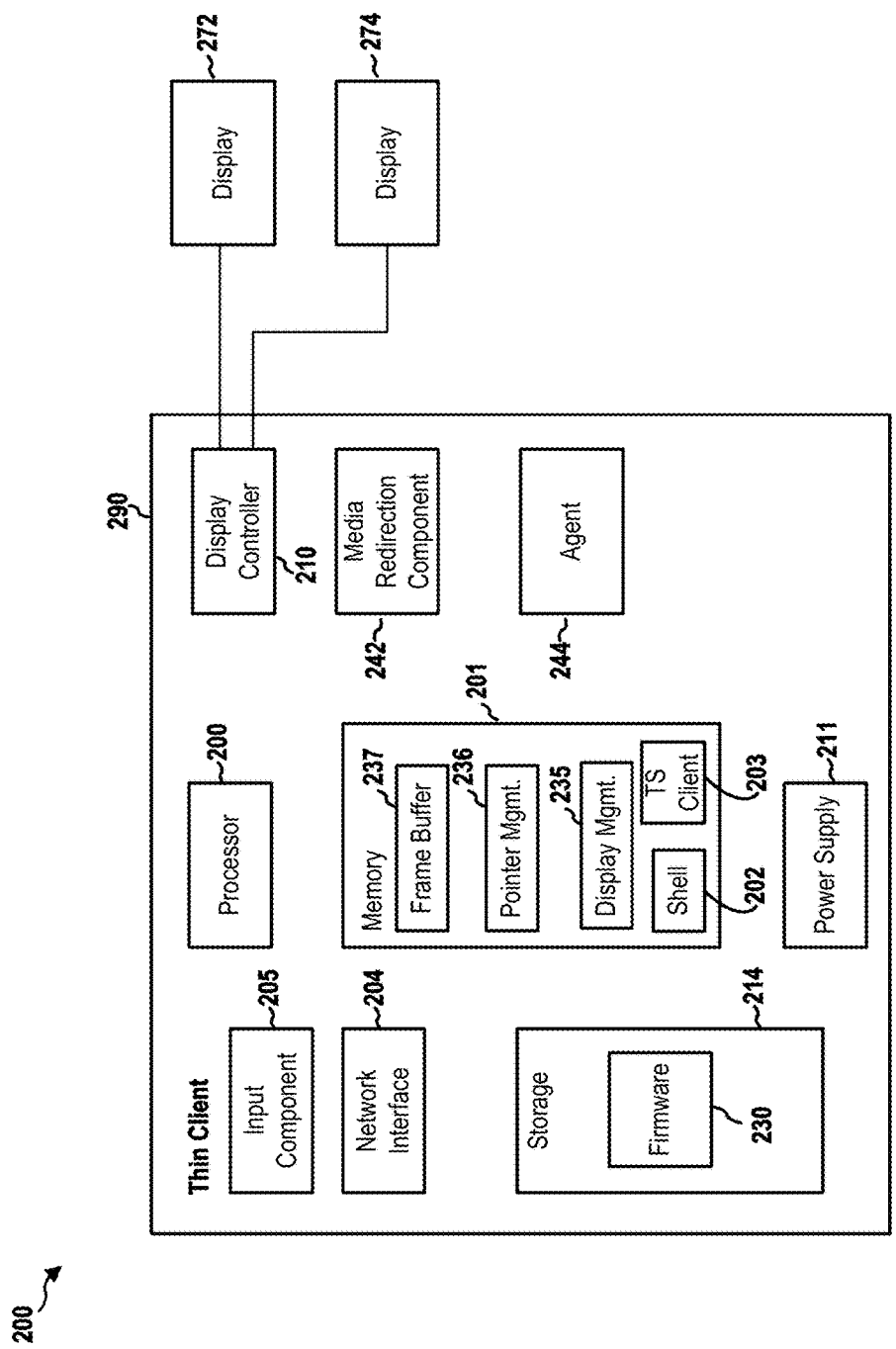
FIG. 2 is a diagram illustrating an exemplary thin client.

FIG. 2 is a diagram 200 illustrating an exemplary thin client. A thin client 290, which may be any one of the thin clients 122-1, 122-2, . . . , 122-M, includes one or more processors 200, which can be microprocessors, controllers or any other suitable type of processors for processing computing executable instructions to control the operation of the device. The computer executable instructions can be provided using any computer-readable media, such as memory 201. The memory 201 is of any suitable type such as random access memory (RAM). The memory 201 may include an area that is designated as a frame buffer 237. The thin client 290 may also include a storage component 214, which may be a storage device of any type such as a magnetic or optical storage device, a hard disk drive, a CD, DVD, or other disc drive, a flash memory, an EPROM, or an EEPROM.

The thin client 290 may store firmware 230 in the storage component 214. When the processor 200 executes the firmware 230, the processor 200 loads code and data of the firmware 230 into the memory 201. This example shows that the firmware 230 provides in the memory 201, among other components, a software shell 202, a terminal server (TS) client 203 application, a display management component 235, and a pointer management component 236 which are described in more detail infra.

A network interface 204 enables the thin client 290 to communicate over a network (in particular a wireless network) with the remote machines 112-1, 112-2, . . . , 112-N. The network interface 204 can be, for example, a WLAN interface, a cellular radio interface, a personal area network (PAN) interface, or any other suitable interface for transmitting and receiving network data. Note that in other examples, a wireless network interface can be replaced with a wired communication interface.

The thin client 290 also includes an input component 205. The input component 205 can be wirelessly connected with input peripherals (e.g., the keyboard 132-1 and the mouse 132-2) and receive input from the input peripherals.

Image output of the thin client 290 can be provided by a display controller 210. The display controller 210 may send image signals to one or more displays (e.g., a display device 272 and a display device 274). In particular, the display controller 210 may send image packets to a WLAN display via the network interface 204. The thin client 290 further comprises a power supply 211 such as a battery or a wired power source.

The thin client 290 may also include a media redirect component 242 that redirects a media device to a remote machine. Further, the thin client 290 may also include an agent 244 that can be used to communicate with the remote machine manager 126.

Figure 3:
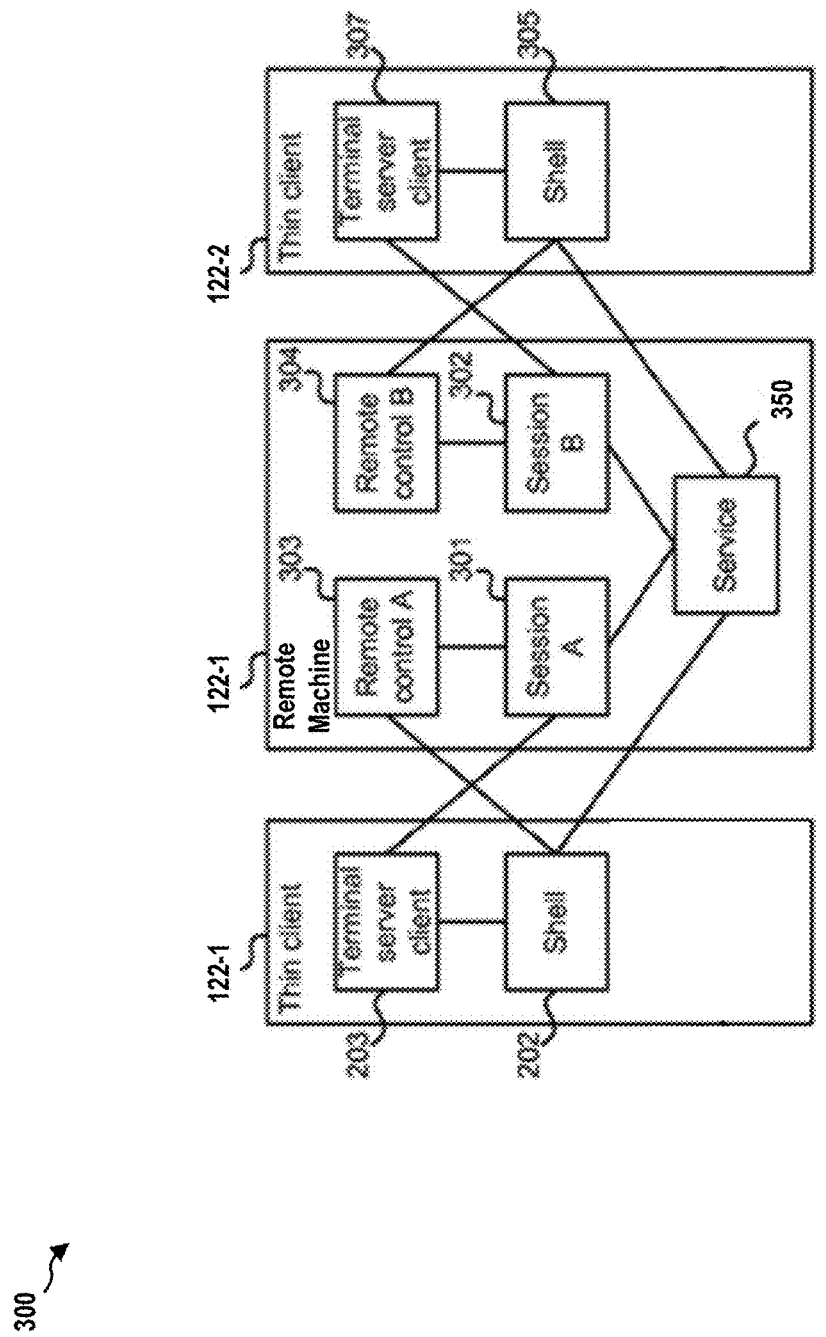
FIG. 3 is a diagram illustrating an example functional block diagram of elements in a thin client system.

FIG. 3 is a diagram 300 illustrating an example functional block diagram of the elements in a thin client system including the thin client 122-1 and the thin client 122-2 and the remote machine 112-1. The thin client 122-1 may include a shell 202 and a terminal server client 203, as described supra. The shell 202 is a lightweight control program that controls the basic operation of the thin client 122-1. In particular, the shell may determine what sessions are available on the remote machine 112-1, and may provide an interface on the display of the thin client 122-1 for the user to select a session to log into. The terminal server client 203 is a program that enables the user to interact with a particular session, and view the user interface of the session on the display of the thin client 122-1.

The remote machine 112-1 may include a software service 350 which is arranged to control and manage multiple sessions executed on the remote machine 112-1. In the example shown in FIG. 3, two sessions are running on the remote machine 112-1: session A 301 and session B 302. In other examples, more sessions could also be running on the remote machine 112-1 as well. Also note that the service 350 and sessions 301, 302 do not have to be running on the same remote machine 112-1 as shown in FIG. 3, but can be running on different remote machines. For example, instead of on the remote machine 112-1, the session 302 may be running on the remote machine 112-2.

Each session corresponds to applications and data that are accessible to one or more users. In certain configurations, a session may include a user interface of a remote desktop (i.e., a complete view of a computer desktop with several accessible applications). In certain configurations, a session may only include one or more individual applications. For example, session A 301 may correspond to a first user using a word processing application in a desktop, and session B 302 may be a stand-alone calendar application that is accessible to several users. In one example, the session is provided to the TS client 203 using a remote session protocol such as the remote desktop protocol (RDP) or virtual network computing (VNC), which may enable both desktop and application remote operation.

Each session 301, 302 on the remote machine 112-1 is optionally executing a software remote control 303, 304. The remote control 303, 304 enables the user in a session to change settings of the thin client device (even though the remote control is on the remote machine, and not on the thin client device itself). For example, these settings may include display settings at the thin client 122-1.

In the example of FIG. 3, the thin client 122-1 is accessing session A 301. The shell 202 receives data from the sensing device 206, and communicates with the TS client 203 and the service 301 on the remote machine 112-1. Session A 301 communicates with the TS client 203 and remote control A 303. Remote control A 301 communicates with the shell 202 on the thin client 122-1.

The remote machine 112-1 in FIG. 3 is also shown connected to the thin client 122-2. The thin client 122-2 has a similar structure to the thin client 122-1 in that it includes a shell 305 and a TS client 307. The thin client 122-2 is shown accessing session B 302 in FIG. 3.

Figure 4:
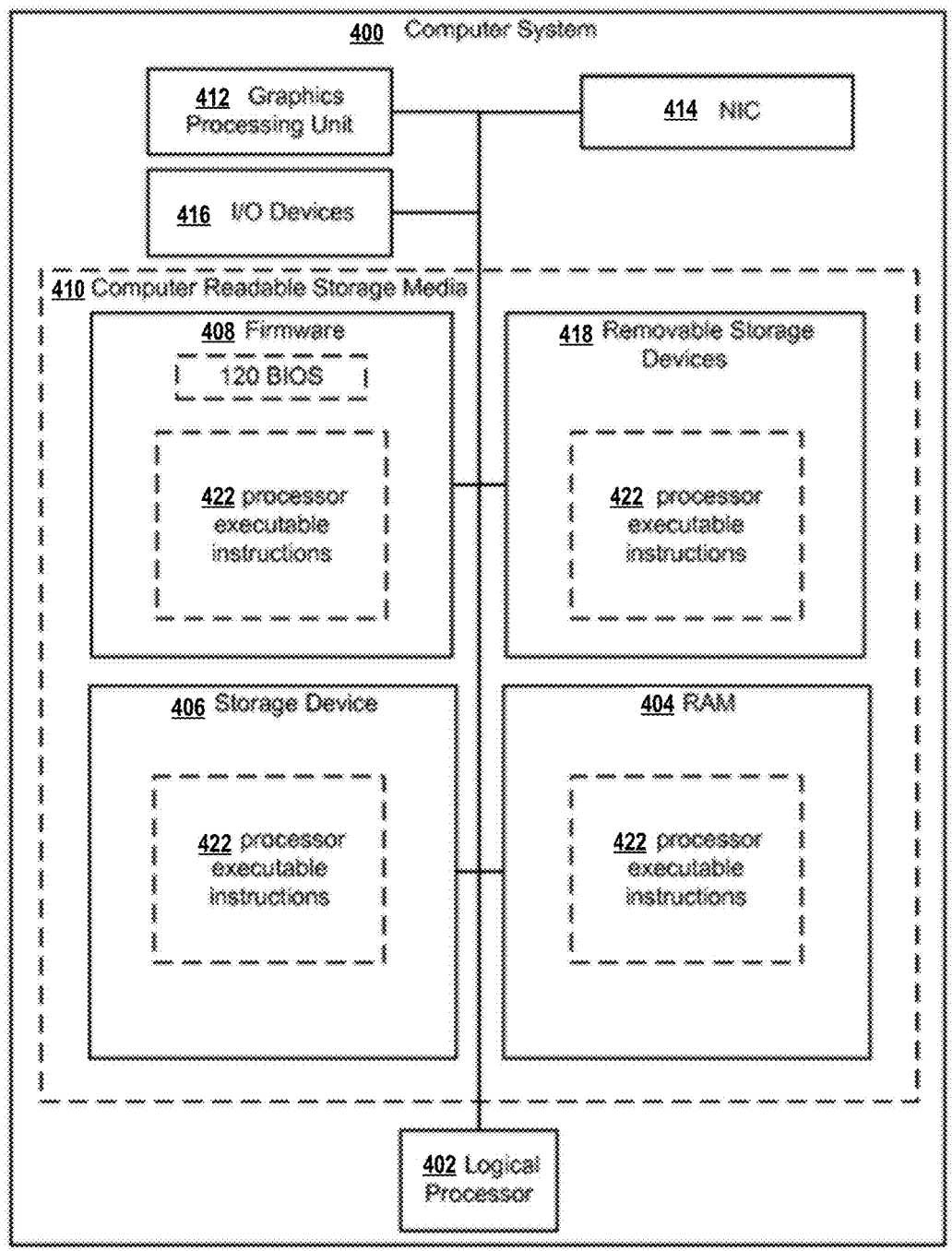
FIG. 4 is a diagram illustrating an exemplary computing system.

As described supra, each of the remote machines 112-1, 112-2, . . . , 112-N may be a virtual machine or a physical machine. Referring now to FIG. 4, an exemplary computing system 400 (i.e., a physical machine) is depicted. Computer system 400 can include logical processor 402, e.g., an execution core. While one logical processor 402 is illustrated, in other embodiments computer system 400 may have multiple logical processors, e.g., multiple execution cores per processor substrate and/or multiple processor substrates that could each have multiple execution cores. As shown by the FIG. 4, various computer readable storage media 410 can be interconnected by one or more system busses which couple various system components to the logical processor 402. The system buses may be any of several types of bus structures including a memory bus or memory controller, a peripheral bus, and a local bus using any of a variety of bus architectures. In example embodiments the computer readable storage media 410 can include for example, random access memory (RAM) 404, storage device 406, e.g., electromechanical hard drive, solid state hard drive, etc., firmware 408, e.g., FLASH RAM or ROM, and removable storage devices 418 such as, for example, CD-ROMs, floppy disks, DVDs, FLASH drives, external storage devices, etc. Other types of computer readable storage media can be used such as magnetic cassettes, flash memory cards, and/or digital video disks.

The computer readable storage media 410 can provide nonvolatile and volatile storage of processor executable instructions 422, data structures, program modules and other data for the computer 400 such as executable instructions that effectuate manager 550 described in the following figures. A basic input/output system (BIOS) 420, containing the basic routines that help to transfer information between elements within the computer system 400, such as during start up, can be stored in firmware 408. A number of programs may be stored on firmware 408, storage device 406, RAM 404, and/or removable storage devices 418, and executed by logical processor 402 including an operating system and/or application programs.

Commands and information may be received by computer 400 through input devices 416 which can include, but are not limited to, a keyboard and pointing device. Other input devices may include a microphone, joystick, game pad, scanner or the like. These and other input devices are often connected to logical processor 402 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a graphics processor unit (GPU) 412. In addition to the display, computers typically include other peripheral output devices, such as speakers and printers (not shown). The exemplary system of FIG. 4 can also include a host adapter, Small Computer System Interface (SCSI) bus, and an external storage device connected to the SCSI bus.

Computer system 400 may operate in a networked environment using logical connections to one or more remote computers. The remote computer may be another computer, a server, a router, a network PC, a peer device or other common network node, and typically can include many or all of the elements described above relative to computer system 400.

When used in a LAN or WAN networking environment, computer system 400 can be connected to the LAN or WAN through network interface card (NIC) 414. The NIC 414, which may be internal or external, can be connected to the system bus. In a networked environment, program modules depicted relative to the computer system 400, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 5:
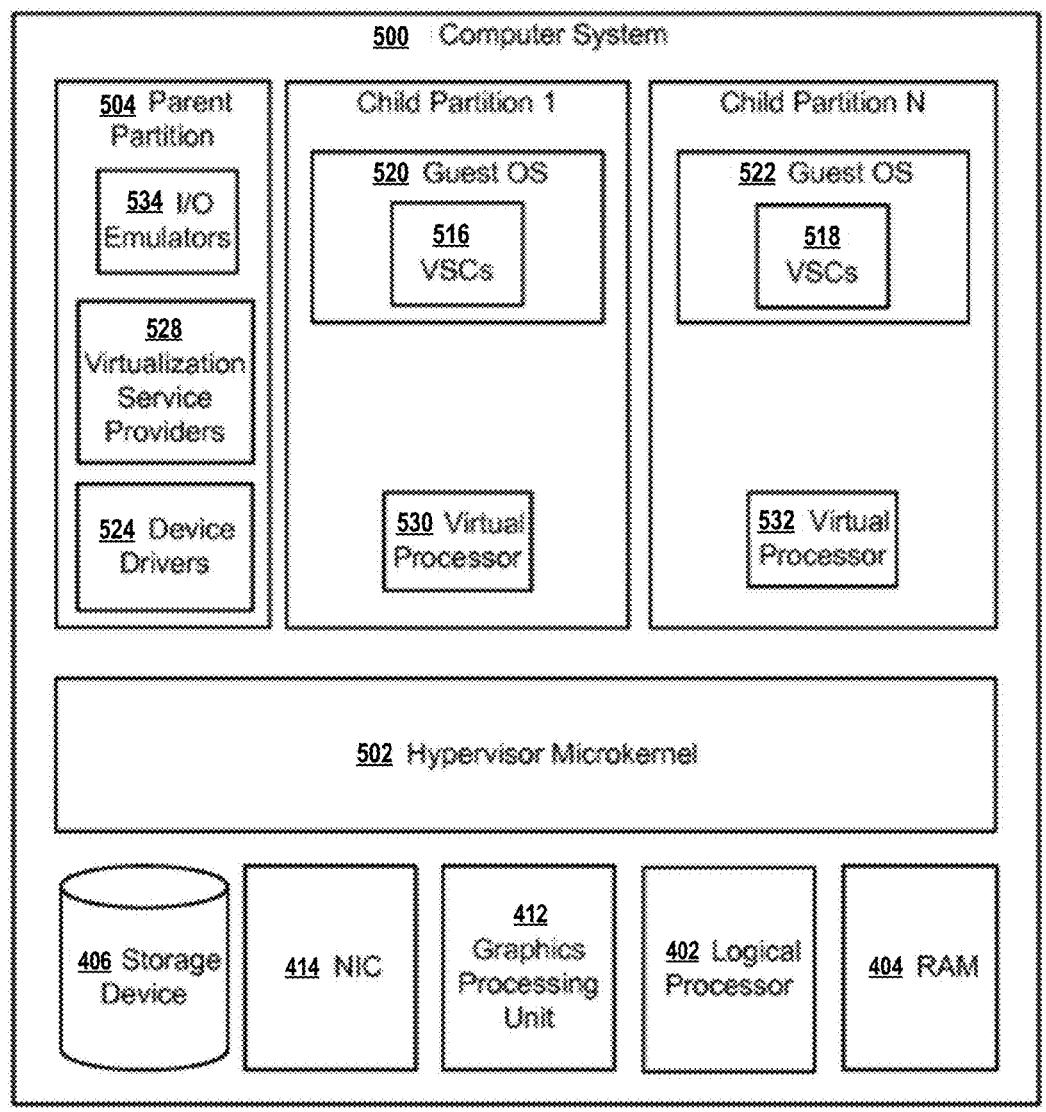
FIG. 5 is a diagram illustrating a virtual machine computing system.

Turning to FIG. 5, hypervisor microkernel 502 can be configured to control and arbitrate access to the hardware of computer system 500. The computer system 500 may employ the storage device 406, the NIC 414, the GPU 412, the logic processor 402, and the RAM 404 as described supra. Broadly, hypervisor microkernel 502 can generate execution environments called partitions such as child partition 1 through child partition N (where N is an integer greater than 1). In embodiments, a child partition is the basic unit of isolation supported by hypervisor microkernel 502. Hypervisor microkernel 502 can isolate processes in one partition from accessing another partition's resources, e.g., a guest operating system in one partition may be isolated from the memory of another partition and thus may not be able to detect memory addresses outside of its partition. Each child partition can be mapped to a set of hardware resources, e.g., memory, devices, logical processor cycles, etc., that is under control of the hypervisor microkernel 502. In embodiments hypervisor microkernel 502 can be a stand-alone software product, a part of an operating system, embedded within firmware of the motherboard, specialized integrated circuits, or a combination thereof.

Hypervisor microkernel 502 can enforce partitioning by restricting a guest operating system's view of system memory. Guest physical memory (GPM) is a partition's view of memory that is controlled by hypervisor microkernel 502. System physical memory (SPM) is the memory from the view of hypervisor microkernel 502. Pages are fixed length blocks of memory with starting and ending addresses. System physical memory can be allocated to virtual machines as guest physical memory. Thus, a page of memory allocated to a virtual machine will have a guest physical address (the address used by the virtual machine) and a system physical address (the actual address of the page). The term guest physical memory is a shorthand way of describe a page of memory from the viewpoint of a virtual machine and the term system physical memory is shorthand way of describing a page of memory from the viewpoint of the physical system.

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. Thus, a memory address may have a guest virtual address, a guest physical address, and a system physical address in an exemplary embodiment.

In the depicted example, parent partition component 504, which can also be also thought of as similar to domain 0 of Xen's open source hypervisor is illustrated. Parent partition 504 in this operational environment can be configured to provide resources to guest operating systems executing in the child partitions 1-N by using virtualization service providers 528 (VSPs) that are typically referred to as backend drivers in the open source community. Broadly, VSPs 528 can be used to multiplex the interfaces to the hardware resources by way of virtualization service clients (VSCs) (typically referred to as front-end drivers in the open source community) and communicate with the virtualization service clients via communication protocols. As shown by the figures, virtualization service clients can execute within the context of guest operating systems. These drivers are different than the rest of the drivers in the guest in that they may be supplied with a hypervisor, not with a guest.

As shown by the figure, emulators 534, e.g., virtualized IDE devices, virtualized video adaptors, virtualized NICs, etc., can be configured to run within the parent partition 504 and attached to resources available to guest operating systems 520 and 522. For example, when a guest OS touches a register of a virtual device or memory mapped to the virtual device microkernel hypervisor 502 can intercept the request and pass the values the guest attempted to write to an associated emulator.

Each child partition can include one or more virtual processors (530 and 532) that guest operating systems (520 and 522) can manage and schedule threads to execute thereon. Generally, the virtual processors are executable instructions and associated state information that provide a representation of a physical processor with a specific architecture. For example, one virtual machine may have a virtual processor having characteristics of an INTEL x86 processor, whereas another virtual processor may have the characteristics of an ARM processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processor execute hypervisor instructions. The combination of virtual processors and memory in a partition can be considered a virtual machine.

Guest operating systems (520 and 522) can be any operating system such as, for example, operating systems from MICROSOFT, APPLE, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 6:
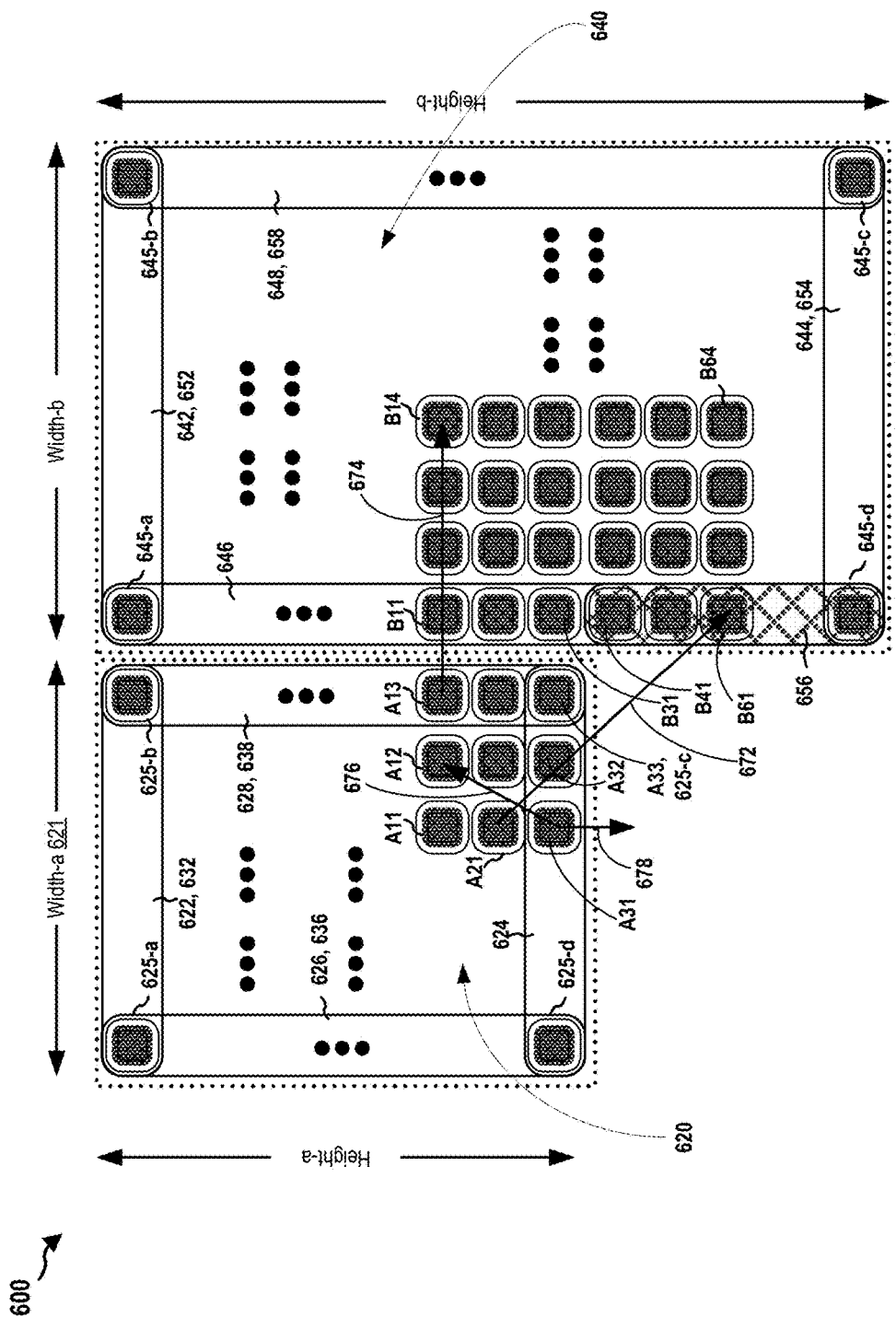
FIG. 6 is a diagram illustrating operations of aligning screens of a thin client and moving a pointer within the bounds of the aligned screens.

FIG. 6 is a diagram 600 illustrating operations of aligning screens of the thin client 290 and moving a pointer within the bounds of the aligned screens. The thin client 290 may utilizes multiple displays (screens). For simplicity, this example only shows that the thin client 290 is connected with the display device 272 and the display device 274. The display device 272 includes a screen 620 and the display device 274 includes a screen 640. The display management component 235 may automatically detect resolution information of the screen 620 and the screen 640. Further, the display management component 235 may obtain dimension information of the screen 620 and the screen 640 from a user through the input component 205. In particular, the display management component 235 receives a resolution width$_a$ (e.g., 1080 pixels) and a resolution height$_a$ (e.g., 1920 pixels) of the screen 620 as well as a resolution width$_b$ (e.g., 1152 pixels) and a resolution height$_b$ (e.g., 2048 pixels) of the screen 640. Based on the resolution width$_a$ and the resolution height$_a$, the display management component 235 can determine a top border edge 622, a bottom border edge 624, a left border edge 626, and a right border edge 628, each of which is a line of pixels at the edge of the screen 620. Based on the resolution width$_b$ and the resolution height$_b$, the display management component 235 can determine a top border edge 642, a bottom border edge 644, a left border edge 646, and a right border edge 648, each of which is a line of pixels at the edge of the screen 640.

As an example, the display management component 235 can align monitors (displays) of the thin client 290 such that no monitor overlaps another monitor and that each monitor is in touch with at least one other monitor. Further, the display management component 235 may accordingly generate image data for the screen 620 and the screen 640 and write those image data to the frame buffer 237. The display management component 235 can read image data from the frame buffer 237 and accordingly generate display signals for displaying the images the screen 620 and the screen 640.

The display management component 235 can decide to align the screen 620 and the screen 640 in accordance with a set of predetermined rules, which may be based on user preferences or default settings. For example, the screen 620 and the screen 640 can be top aligned (i.e., the top border edge 622 and the top border edge 642 form a single straight line), bottom aligned (i.e., the bottom border edge 624 and the bottom border edge 644 form a single straight line), left aligned (i.e., the left border edge 626 and the left border edge 646 form a single straight line), or right aligned (i.e., the right border edge 628 and the right border edge 648 form a single straight line). When the screen 620 and the screen 640 are aligned, they are in contact with each other but do not overlap. Further, the display management component 235 can determine an order (e.g., left, right, top, bottom) of the aligned screens based on a set of predetermined rules, which may be based on user preferences or default settings. In this example, the display management component 235 can determine whether the screen 620 or the screen 640 is on the left or on the top.

In this example, the display management component 235 determines to top align the screen 620 and the screen 640 with the screen 620 positioned on the left, based user inputs received through the input component 205. Accordingly, the display management component 235 can determine pixel coordinates of corner pixels 625-a, 625-b, 625-c, 625-d. For example, the coordinates of the corner pixels 625-a, 625-b, 625-c, 625-d may be (0, 0), (0, resolution width$_a$−1), (height$_a$−1, 0), (height$_a$−1, resolution width$_a$−1). The display management component 235 further determines corner pixels 645-a, 645-b, 645-c, 645-d of the screen 640. As the screen 640 is top aligned with the screen 620, the display management component 235 determines that the top border edge 622 of the screen 620 and the top border edge 642 of the screen 640 form a straight line in a horizontal direction. As such, the coordinates of the corner pixels 645-$a$, 645-$b$, 645-$c$, 645-$d$ are (0, resolution width$_a$), (0, resolution width$_a$+resolution width$_b$−1), (height$_b$−1, resolution width$_a$+resolution width$_b$−1), (height$_b$−1, resolution width$_a$)

Further, in this example, the resolution height$_b$ is longer the resolution height$_a$. After being aligned by the display management component 235, the right border edge 628 of the screen 620, which includes pixels from the corner pixel 625-$b$ to the corner pixel 625-$c$, is in contact with the left border edge 646 of screen 640, which includes pixels from the corner pixel 645-$a$ to the corner pixel 645-$d$.

The display management component 235 then calculates border segments of the screen 620 and the screen 640. A border segment of a border edge is the section of the border edge that is not in contact with any border edges of any other screens. In particular, the display management component 235 removes an in-contact section of the border edge that is in contact with another screen to generate the border segment. When a section of a border edge of a first screen having at least two pixels is parallel with and side by side with the same number pixels of a section of a border edge of a second screen, the two sections of the first and second screens are in-contact sections and are in contact with each other.

In this example, FIG. 6 shows 9 pixels (i.e., from pixel $A_{11}$ to pixel $A_{33}$) forming a 3 by 3 matrix at the bottom right corner of the screen 620. The corner pixel 625-$c$ and the pixel $A_{33}$ are the same pixel. FIG. 6 also shows 24 pixels (i.e., from pixel $B_{11}$ to pixel $B_{64}$) of the screen 640 forming a 6 by 4 matrix at the left border edge 646. Further, as shown, the entire right border edge 628 is in contact with the section of the left border edge 646 having pixels from the corner pixel 645-$a$ to the pixel $B_{31}$. Therefore, the in-contact section of the right border edge 628 contains the entire right border edge 628 (i.e., from the corner pixel 625-$b$ to the corner pixel 625-$c$). The in-contact section of the left border edge 646 contains the pixels from the corner pixel 645-$a$ to the pixel $B_{31}$.

With respect to the screen 620, the left border edge 626, the top border edge 622, and the bottom border edge 624 each do not have an in-contact section and, thus, become a left border segment 636, a top border segment 632, and a bottom border segment 634. As described supra, the screen 620 does not have a right border segment.

With respect to the screen 640, the right border edge 648, the top border edge 642, and the bottom border edge 644 each do not have an in-contact section and, thus, become a right border segment 658, a top border segment 632, and a bottom border segment 654. As described supra, the left border edge 646 has an in-contact section containing the pixels from the corner pixel 645-$a$ to the pixel $B_{31}$. As such, the screen 640 has a left border segment 656 containing the pixels from the pixel $B_{41}$ to the corner pixel 645-$d$. The pixel $B_{41}$ and the corner pixel 645-$d$ are end points of the left border segment 656.

As such, the top border segment 632, the top border segment 652, the right border segment 658, the bottom border segment 654, the left border segment 656, the bottom border segment 634, and the left border segment 636 define a screen area of the thin client 290.

Further, the pointer management component 236 may generate a pointer (e.g., a cursor) and displays the pointer at a location on the screen area formed by the screen 620 and the screen 640. Further, the input component 205 may receive inputs from a pointer device (e.g., a mouse) to move the pointer to another location.

In one example, initially, the pointer management component 236 may display the pointer at the pixel $A_{21}$. Subsequently, the pointer management component 236 may receive requests from the input component 205 to move the pointer to the pixel $B_{61}$. The pointer management component 236 may accordingly determine a trajectory 672 from the initial pointer location (e.g., the pixel $A_{21}$) to the end pointer location (e.g., the pixel $B_{61}$). Based on the trajectory 672, the pointer management component 236 may generate a series single pixel movements to move the pointer from the initial pointer location to the end pointer location. More specifically, within each single pixel movement, the pointer management component 236 moves, generally along the trajectory 672, the pointer one pixel in the horizontal direction and/or one pixel in the vertical direction.

Prior to a movement, the pointer management component 236 determines whether the initial pointer location is on a border segment of the screen 620 and the screen 640. When the pointer location is not on a border segment, pointer management component 236 applies a movement to the pointer.

In this example, the pointer management component 236 determines that the initial pointer location (i.e., the pixel $A_{21}$) is not on a border segment. Then, the pointer management component 236 determines to, in a first movement, move the pointer one pixel in the horizontal direction to the right and one pixel in the vertical direction to the bottom, generally along the trajectory 672. As such, the pointer moves from the pixel $A_{21}$ to the pixel $A_{32}$.

Subsequently, the pointer management component 236 determines whether the current pointer location of the pointer is on a border segment. In this example, the pointer management component 236 determines that the pointer location (i.e., the pixel $A_{32}$) is on the bottom border segment 634. The pointer management component 236 also determines that the trajectory 672 is not toward inside of the screen area of the thin client 290 and is not perpendicular to the bottom border segment 634. As such, the pointer management component 236 determines that the pointer may be further moved on the bottom border segment 634. More specifically, the pointer management component 236 determines that, in order to move the pointer along the trajectory 672, it would need to move the pointer one pixel in the horizontal direction to the right and one pixel in the vertical direction to the bottom. As the pointer is on the bottom border segment 634, further moving the pointer to the bottom would make the pointer out of the screen area of the thin client 290. On the other hand, further moving the pointer to the right would not make the pointer out of the screen area. Accordingly, the pointer management component 236 moves the pointer from the pixel $A_{32}$ to the pixel $A_{33}$. Further, in certain configurations, as the pointer management component 236 has not been able to make a full movement (i.e., in both vertical direction and horizontal direction) along the trajectory 672, the pointer management component 236 maintains the pointer in its current pointer location (i.e., the pixel $A_{33}$) without further movement.

In another example, initially the pointer management component 236 may display the pointer at the pixel $A_{13}$. Subsequently, the pointer management component 236 may receive requests from the input component 205 to move the pointer to the pixel $B_{14}$. The pointer management component 236 may accordingly determine a trajectory 674 from the initial pointer location (e.g., the pixel $A_{13}$) to the end pointer location (e.g., the pixel $B_{14}$). Based on the trajectory 674, the pointer management component 236 may generate a series single pixel movements to move the pointer from the initial pointer location to the end pointer location. More specifically, in each movement, the pointer management component 236 moves the pointer one pixel in the horizontal direction to the right. As the trajectory 674 does not encounter a border segment, the pointer management component 236 moves the pointer along the trajectory 674 from the pixel $A_{12}$ to the pixel $B_{14}$.

In yet another example, the pointer initially may be at pixel $A_{31}$ and the input component 205 requests the pointer management component 236 to move the pointer in a trajectory 676 to the pixel $A_{12}$. The pointer management component 236 determines that the trajectory is toward inside of the screen area of the thin client 290. Accordingly, the pointer management component 236 may move the pointer to the pixel $A_{21}$ in a first movement and then to the pixel $A_{12}$ in a second movement.

In an additional example, the pointer initially may be at the pixel $A_{31}$ and the input component 205 requests the pointer management component 236 to move the pointer in a trajectory 678 that is perpendicular to the bottom border segment 634 and away from the screen area of the thin client 290. Accordingly, the pointer management component 236 determines that the pointer should remain at the pixel $A_{31}$ and does not move the pointer.

Figure 7:
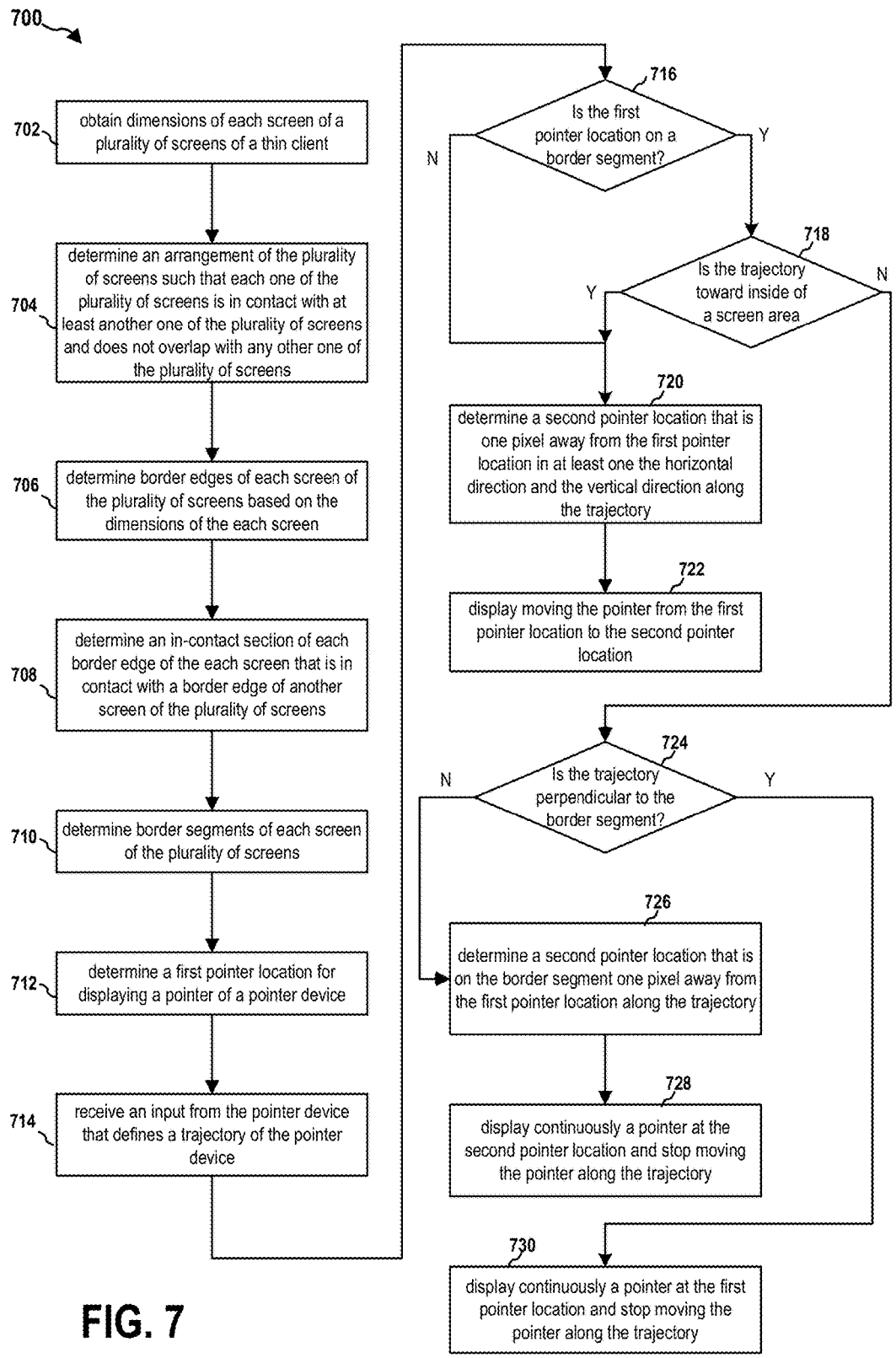
FIG. 7 is a flow chart of a method (process) for aligning screens of a thin client and moving a pointer within the bounds of the aligned screens.

FIG. 7 is a flow chart 700 of a method (process) for aligning screens of a thin client and moving a pointer within the bounds of the aligned screens. The method may be performed by a thin client (e.g., the thin client 122-1 and the apparatus 290/290').

At operation 702, the thin client obtains dimensions of each screen of a plurality of screens of the thin client (e.g., the resolution width$_a$ and the resolution height$_a$ of the screen 620 as well as the resolution width$_b$ and the resolution height$_b$ of the screen 640). At operation 704, the thin client determines an arrangement of the plurality of screens such that each one of the plurality of screens is in contact with at least another one of the plurality of screens and does not overlap with any other one of the plurality of screens. At operation 706, the thin client determines border edges of each screen of the plurality of screens based on the dimensions of the each screen. The border edges define the each screen.

At operation 708, the thin client determines an in-contact section of each border edge of the each screen that is in contact with a border edge of another screen of the plurality of screens. A corresponding border segment of the each border edge is determined by removing the in-contact section of the each border edge from the each border edge. At operation 710, the thin client determines border segments of each screen of the plurality of screens. Each of the border segments of the each screen is not in contact with any border segment of any other screens of the plurality of screens.

At operation 712, the thin client determines a first pointer location for displaying a pointer of a pointer device. At operation 714, the thin client receives an input from the pointer device that defines a trajectory of the pointer device.

At operation 716, the thin client determines whether the first pointer location is on a border segment. When the first pointer location is on the border segment, at operation 718, the thin client determines whether the trajectory is toward inside of a screen area defined by the border segments of the plurality of screens. When the thin client determines that the trajectory is toward inside of the screen area (e.g., the trajectory 676 from the pixel $A_{31}$), the thin client proceeds to operation 720. When the thin client determines that the trajectory is not toward inside of the screen area (e.g., the trajectory 672 from the pixel $A_{32}$), the thin client proceeds to operation 724. Further, when the first pointer location (e.g., the pixel $A_{21}$) is not on the border segment as determined in the operation 716, the thin client proceeds to operation 720.

At operation 720, the thin client determines a second pointer location (e.g., the pixel $A_{32}$) that is one pixel away from the first pointer location (e.g., the pixel $A_{21}$) in at least one of a horizontal direction and a vertical direction along the trajectory (e.g., the trajectory 672). At operation 722, the thin client displays moving the pointer from the first pointer location to the second pointer location.

When the thin client is at operation 724, the thin client further determines whether the trajectory is perpendicular to the border segment. When the thin client determines that the trajectory is not perpendicular to the border segment (e.g., the trajectory 672 from the pixel $A_{32}$), at operation 726, the thin client determines a second pointer location (e.g., the pixel $A_{33}$) that is one pixel away from the first pointer location (e.g., the pixel $A_{32}$) on the border segment (e.g., the bottom border segment 634) along the trajectory. At operation 728, the thin client displays continuously a pointer at the second pointer location and stops moving the pointer along the trajectory (e.g., the pointer remains at the pixel $A_{33}$).

When the thin client determines that the trajectory is perpendicular to the border segment (e.g., the trajectory 678 from the pixel $A_{31}$), at operation 730, the thin client displays continuously a pointer at the first pointer location and stops moving the pointer along the trajectory (e.g., the pointer remains at the pixel $A_{31}$).

In certain configurations, each two screens of the plurality of screens are top-aligned, bottom-aligned, left-aligned, or right-aligned.

Figure 8:
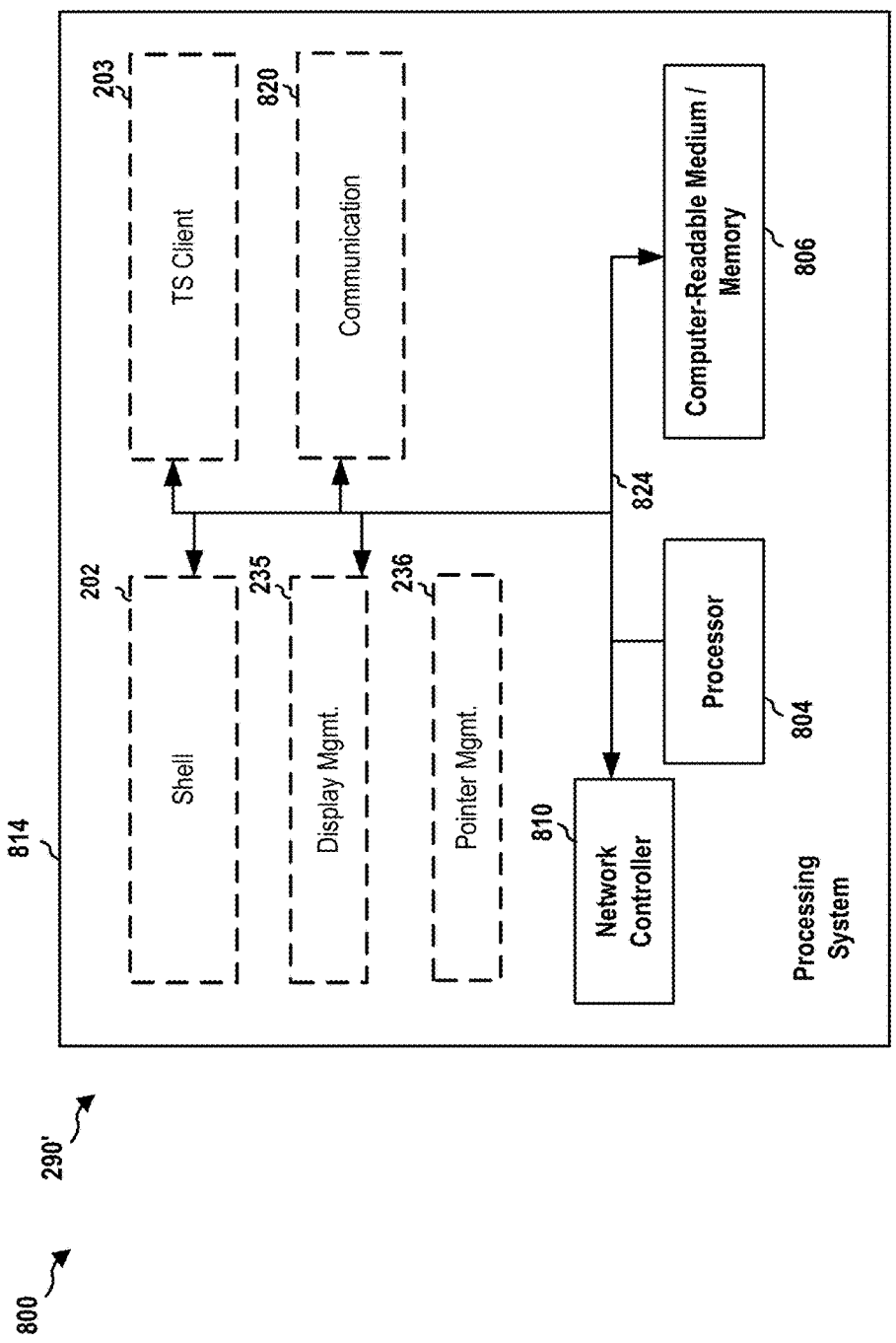
FIG. 8 is a diagram illustrating an example of a hardware implementation for an apparatus employing a processing system.

FIG. 8 is a diagram 800 illustrating an example of a hardware implementation for an apparatus 290' (e.g., the thin client 290) employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, including the processor 804 the computer-readable medium/memory 806, and the network controller 810. In particular, the computer-readable medium/memory 806 may include the memory 201 and the storage component 214. The bus 824 may also link various other circuits such as timing sources, peripherals, voltage regulators, and power management circuits, which are well known in the art, and therefore, will not be described any further.

The processing system 814 may be coupled to a network controller 810. The network controller 810 provides a means for communicating with various other apparatus over a network. The network controller 810 receives a signal from the network, extracts information from the received signal, and provides the extracted information to the processing system 814, specifically the communication component 820. In addition, the network controller 810 receives information from the processing system 814, specifically the communication component 820, and based on the received information, generates a signal to be sent to the network. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system further includes at least one of the display management component 235 and the pointer management component 236. The components may be software components running in the processor 804, resident/stored in the computer readable medium/memory 806, one or more hardware components coupled to the processor 804, or some combination thereof.

The apparatus 290/290' may be configured to include means for performing each of the operations described supra referring to FIG. 7. The aforementioned means may be one or more of the aforementioned components of the apparatus 290 and/or the processing system 814 of the apparatus 290' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a thin client, comprising:
   obtaining dimensions of each screen of a plurality of screens of the thin client;
   determining an arrangement of the plurality of screens such that each one of the plurality of screens is in contact with at least another one of the plurality of screens and does not overlap with any other one of the plurality of screens;
   determining border segments of each screen of the plurality of screens, wherein each of the border segments of the each screen is not in contact with any border segment of any other screens of the plurality of screens;
   determining a first pointer location for displaying a pointer of a pointer device;
   receiving an input from the pointer device that defines a trajectory of the pointer device;
   determining whether the first pointer location is on a border segment;
   determining a second pointer location that is one pixel away from the first pointer location in at least one of a horizontal direction and a vertical direction along the trajectory in response to
      (a) a determination that the first pointer location is not on a border segment, or
      (b) a determination that the first pointer location is on a border segment and the trajectory is toward inside of a screen area defined by the border segments of the plurality of screens;
   displaying moving the pointer from the first pointer location to the second pointer location;
   in response to a determination (a) that the first pointer location is on a border segment and (b) that the trajectory is not perpendicular to the border segment and not toward inside of a screen area defined by the border segments of the plurality of screens, determining a second pointer location that is one pixel away from the first pointer location on the border segment along the trajectory; and
   displaying continuously a pointer at the second pointer location and stopping moving the pointer along the trajectory.

2. The method of claim 1, further comprising:
   determining border edges of each screen of the plurality of screens based on the dimensions of the each screen, the border edges defining the each screen;
   determining an in-contact section of each border edge of the each screen that is in contact with a border edge of another screen of the plurality of screens, wherein a corresponding border segment of the each border edge is determined by removing the in-contact section of the each border edge from the each border edge.

3. The method of claim 1, further comprising: in response to a determination (a) that the first pointer location is on a border segment and (b) that the trajectory is perpendicular to the border segment and not toward inside of a screen area defined by the border segments of the plurality of screens, displaying continuously a pointer at the first pointer location and stopping moving the pointer along the trajectory.

4. The method of claim 1, wherein in the arrangement, each two screens of the plurality of screens are top-aligned, bottom-aligned, left-aligned, or right-aligned.

5. An apparatus, the apparatus being a thin client, comprising:
   a memory; and
   at least one processor coupled to the memory and configured to:

obtain dimensions of each screen of a plurality of screens of the thin client;

determine an arrangement of the plurality of screens such that each one of the plurality of screens is in contact with at least another one of the plurality of screens and does not overlap with any other one of the plurality of screens;

determine border segments of each screen of the plurality of screens, wherein each of the border segments of the each screen is not in contact with any border segment of any other screens of the plurality of screens;

determine a first pointer location for displaying a pointer of a pointer device;

receive an input from the pointer device that defines a trajectory of the pointer device;

determine whether the first pointer location is on a border segment;

determine a second pointer location that is one pixel away from the first pointer location in at least one of a horizontal direction and a vertical direction along the trajectory in response to (a) a determination that the first pointer location is not on a border segment, or (b) a determination that the first pointer location is on a border segment and the trajectory is toward inside of a screen area defined by the border segments of the plurality of screens;

display moving the pointer from the first pointer location to the second pointer location;

in response to a determination (a) that the first pointer location is on a border segment and (b) that the trajectory is not perpendicular to the border segment and not toward inside of a screen area defined by the border segments of the plurality of screens, determine a second pointer location that is one pixel away from the first pointer location on the border segment along the trajectory; and display continuously a pointer at the second pointer location and stop moving the pointer along the trajectory.

6. The apparatus of claim 5, wherein the at least one processor is further configured to:

determine border edges of each screen of the plurality of screens based on the dimensions of the each screen, the border edges defining the each screen;

determine an in-contact section of each border edge of the each screen that is in contact with a border edge of another screen of the plurality of screens, wherein a corresponding border segment of the each border edge is determined by removing the in-contact section of the each border edge from the each border edge.

7. The apparatus of claim 5, wherein the at least one processor is further configured to: in response to a determination (a) that the first pointer location is on a border segment and (b) that the trajectory is perpendicular to the border segment and not toward inside of a screen area defined by the border segments of the plurality of screens, display continuously a pointer at the first pointer location and stop moving the pointer along the trajectory.

8. The apparatus of claim 5, wherein in the arrangement, each two screens of the plurality of screens are top-aligned, bottom-aligned, left-aligned, or right-aligned.

9. A non-transitory computer-readable medium storing computer executable code for operating a thin client, comprising code to:

obtain dimensions of each screen of a plurality of screens of the thin client;

determine an arrangement of the plurality of screens such that each one of the plurality of screens is in contact with at least another one of the plurality of screens and does not overlap with any other one of the plurality of screens;

determine border segments of each screen of the plurality of screens, wherein each of the border segments of the each screen is not in contact with any border segment of any other screens of the plurality of screens;

determine a first pointer location for displaying a pointer of a pointer device;

receive an input from the pointer device that defines a trajectory of the pointer device;

determine whether the first pointer location is on a border segment;

determine a second pointer location that is one pixel away from the first pointer location in at least one of a horizontal direction and a vertical direction along the trajectory in response to (a) a determination that the first pointer location is not on a border segment, or (b) a determination that the first pointer location is on a border segment and the trajectory is toward inside of a screen area defined by the border segments of the plurality of screens;

display moving the pointer from the first pointer location to the second pointer location;

in response to a determination (a) that the first pointer location is on a border segment and (b) that the trajectory is not perpendicular to the border segment and not toward inside of a screen area defined by the border segments of the plurality of screens, determine a second pointer location that is one pixel away from the first pointer location on the border segment along the trajectory; and display continuously a pointer at the second pointer location and stop moving the pointer along the trajectory.

10. The non-transitory computer-readable medium of claim 9, wherein the code is further configured to:

determine border edges of each screen of the plurality of screens based on the dimensions of the each screen, the border edges defining the each screen;

determine an in-contact section of each border edge of the each screen that is in contact with a border edge of another screen of the plurality of screens, wherein a corresponding border segment of the each border edge is determined by removing the in-contact section of the each border edge from the each border edge.

11. The non-transitory computer-readable medium of claim 9, wherein the code is further configured to: in response to a determination (a) that the first pointer location is on a border segment and (b) that the trajectory is perpendicular to the border segment and not toward inside of a screen area defined by the border segments of the plurality of screens, display continuously a pointer at the first pointer location and stop moving the pointer along the trajectory.

* * * * *